United States Patent [19]

Baumann

[11] Patent Number: 4,533,248
[45] Date of Patent: Aug. 6, 1985

[54] RING LASER GYROSCOPE

[75] Inventor: Rainer Baumann, Bruchköbel, Fed. Rep. of Germany

[73] Assignee: Honeywell, Inc., Minneapolis, Minn.

[21] Appl. No.: 422,104

[22] Filed: Sep. 23, 1982

[30] Foreign Application Priority Data

Dec. 18, 1981 [DE] Fed. Rep. of Germany ....... 3150160

[51] Int. Cl.³ .............................................. G01C 19/64
[52] U.S. Cl. ........................................ 356/350; 372/94
[58] Field of Search ........................... 356/350; 372/94

[56] References Cited

U.S. PATENT DOCUMENTS

| 3,373,650 | 3/1968 | Killpatrick | 356/350 |
| 3,467,472 | 9/1969 | Killpatrick | 356/350 |
| 4,085,825 | 4/1978 | Scarborough | 356/350 X |
| 4,436,423 | 3/1984 | Kumar et al. | 372/94 X |

OTHER PUBLICATIONS

Aronowitz, "The Ring Laser", Laser Applications, vol. I, Academic Press, 1971, p. 163.

Primary Examiner—Vincent P. McGraw
Attorney, Agent, or Firm—Robert A. Pajak

[57] ABSTRACT

A resiliently mounted ring laser gyro is dithered below its resonant frequency with a waveform differing from the sine waveform. This is achieved by a piezoelectric motor formed by several piezoelectric elements in a pile. The motor is acting tangentially on a support for the laser and the support takes the form of a strong biased torsion spring.

11 Claims, 9 Drawing Figures

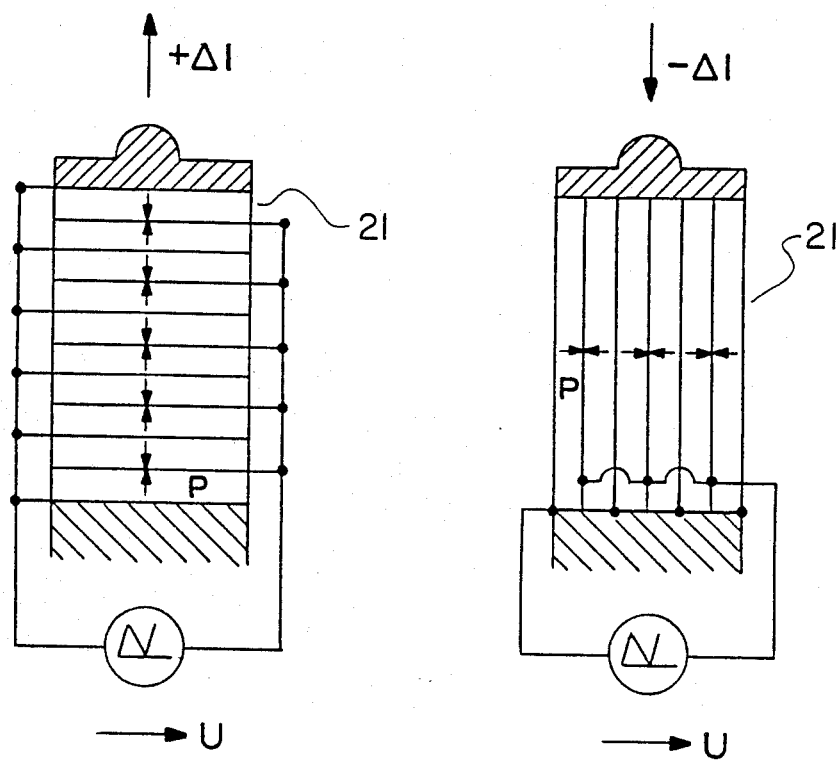

RING LASER GYROSCOPE

The present invention relates to a ring laser gyroscope. In particular, it relates to a device for preventing the lock-in effect.

In a ring laser gyroscope, two light waves are propagating on a triangular shaped path in opposite directions. Whereas one train of light waves is propagating clockwise (cw), the other train of light waves has an opposite propagation direction (ccw). In an inertial reference system, the cw- and ccw-train of light waves of the same mode have the same frequency $\gamma$. However, if the ring laser gyroscope is rotating in an inertial space, then, according to the general relativity theory, the cw- and ccw-trains of light waves have the following difference frequency:

$$\Delta\gamma = K_o \cdot \Omega \tag{1}$$

where $$K_o = (4F_o/\lambda_o L_o)$$

In these equations the used terms have the following meaning:

$\Delta\gamma$ = output difference frequency,
$\Omega$ = input rotational rate,
$\lambda_o$ = vacuum wave length of the laser light,
$L_o$ = optical length of the resonator, and
$F_o$ = surface of the resonator normal to the rotational axis of the gyroscope.

That difference frequency $\Delta\gamma$ may be measured as an output signal by means of different methods of partly decoupling of the cw- and ccw-trains of light waves by means of a mirror and that difference frequency then provides, according to equation (1), the desired input rotational rate $\Omega$ respectively the rotation angle $\xi$ in the event where a time integrating pulse counting method is applied.

Idealistically, both trains of light waves propagating in opposite directions may be regarded as being independent from each other. However, practically in each ring laser gyroscope the cw- and ccw-train of light waves are coupled with each other due to energy exchange, wherein coupling essentially is due to the light backscattering from one light beam into the other beam at the mirrors. According to the theory of coupled oscillators, the effective output difference frequency is presented as follows:

$$\Delta\gamma = K_o \cdot \Omega \sqrt{1 - (\Omega_L/\Omega)^2} \text{ with } \Omega > \Omega_L \tag{2}$$

$$\Delta\gamma = 0 \text{ with } \Omega \leq \Omega_L \tag{3}$$

Evidence of equation (1a) is graphically shown in FIG. 1 of the drawing, wherein the dotted graph shows the ideal response and the solid graph shows the effective response of the output difference frequency $\Delta\gamma$ as the function of the input rotational rate $\Omega$. From FIG. 1 it may be noticed that with input rotational rates smaller than the so-called lock-in threshold $\Omega_L$ the ring laser gyroscope does not provide an output signal $\Delta\gamma$. The oppositely propagating trains of light waves at small differences of their inherent frequencies are locked with each other in the same frequency of oscillation, i.e. their frequencies are synchronized. This known lock-in effect leads to the result that only with input rotational rates $\Omega$ exceeding the lock-in threshold $\Omega_L$, the frequencies of both trains of light waves are decoupled and an output signal $\Delta\gamma$ is received.

To prevent this lock-in effect at low input rotational rates $\Omega$, it is known from U.S. Pat. No. 3,373,650 (DE-PS No. 1 292 899) to impart a mechanical rotary oscillation to the ring laser gyroscope about its input rotational axis. The dither motion impaired to the ring laser gyroscope herewith is to be rated in such a way that the momentary rotational rate $\Omega$ of the gyroscope without an outer rotational rate over the greatest portion of the measuring time lies above the lock-in threshold and in the linear portion of the curve $\Delta\gamma(\Omega)$. The offset of the output signal $\Delta\gamma$ due to the dither motion must be corrected at signal evaluation.

The known laser is suspended on blade springs and the whole system is sinusoidally oscillated in its resonant frequency by means of a motor. At a sinusoidal rotary oscillation with the cyclic frequency $\tilde{z} = 2\pi f$, the rotational angle $\xi$ of the laser gyroscope is presented as follows:

$$\xi = \xi_{max} \sin \omega t \tag{4}$$

By forming the differential with respect to time, one receives the following momentary angle velocity of the ring laser gyroscope:

$$(d\xi/d\tau) = \xi_{max} \cdot \omega \cdot \cos \omega t \tag{5}$$

$$\Omega = \Omega_{max} \cos \omega t \text{ with } \Omega_{max} = \xi_{max} \cdot \omega$$

The response of the signals $\xi$ and $\Omega$ is shown in FIGS. 2a and 2b. Under reference to these figures and to the equation (3a), the not-dead time for a quarter period of the rotary oscillation is presented as follows:

$$t_{not\,dead} = t|\Omega = \Omega_L = \frac{1}{\omega} \arccos\left(\frac{\Omega_L}{\Omega_{max}}\right) \tag{6}$$

$$= \frac{1}{\omega} \arccos \cdot \left(\frac{\Omega_L}{\xi_{max} \cdot \omega}\right)$$

Since the total measuring time $t_{total}$ is presented by $T/4 = \pi/2\omega$, the relationship between not-dead time to the total measuring time is presented as follows:

$$V = \frac{t_{not\,dead}}{t_{total}} = \frac{2}{\pi} \arccos\left(\frac{\Omega_L}{\xi_{max} \cdot \omega}\right) \tag{7}$$

The relation between the total measuring time and the dead time then is given by the following term:

$$V^* = \frac{t_{total}}{t_{dead}} = (1 - V)^{-1} \tag{8}$$

From equation (5) it may be taken that with a sinusoidal rotary dither oscillation, the dither amplitude $\xi_{max}$, and the cyclic dither frequency $\omega = 2\pi\gamma$ should be made as large as possible in order to attain a maximum for the not-dead time. The value $V^*$ resulting from equation (6) is an important figure of merit for a ring laser gyroscope.

From the periodical "Mikrowellen Magazine," Volume 5, 1980, page 422, it is already known to achieve a rectangular bias instead of the sine-shape by providing and accordingly controlling a magnetic mirror in the laser path. However, those magnetic mirrors as well as Faraday cells by other reasons are lowering efficiency of the laser gyroscope.

SUMMARY OF THE INVENTION

It is, therefore, the object of the present invention to improve the figure of merit V* of a ring laser gyroscope, i.e. to improve the relation between the total measuring time and the dead time. This object is achieved by the invention of the present application wherein a driving means is positively engaging the ring laser gyroscope. The driving means is preferably a piezoelectric linear motor. The driving means is arranged to engage a support of the ring laser gyroscope where the support is as a torsion spring. The torsion spring is preloaded so that the gyroscope follows the motion dictated by the motor. The resulting induced motion provided by the driving means arrangement may thus differ from the sine-shape and the dither amplitude and the cyclic dither frequency may attain maximum values.

DESCRIPTION OF THE DRAWINGS

FIGS. 4a and 4b are two piezo stack motors usable to achieve dither motion.

DESCRIPTION OF THE INVENTION

Figure 3A:
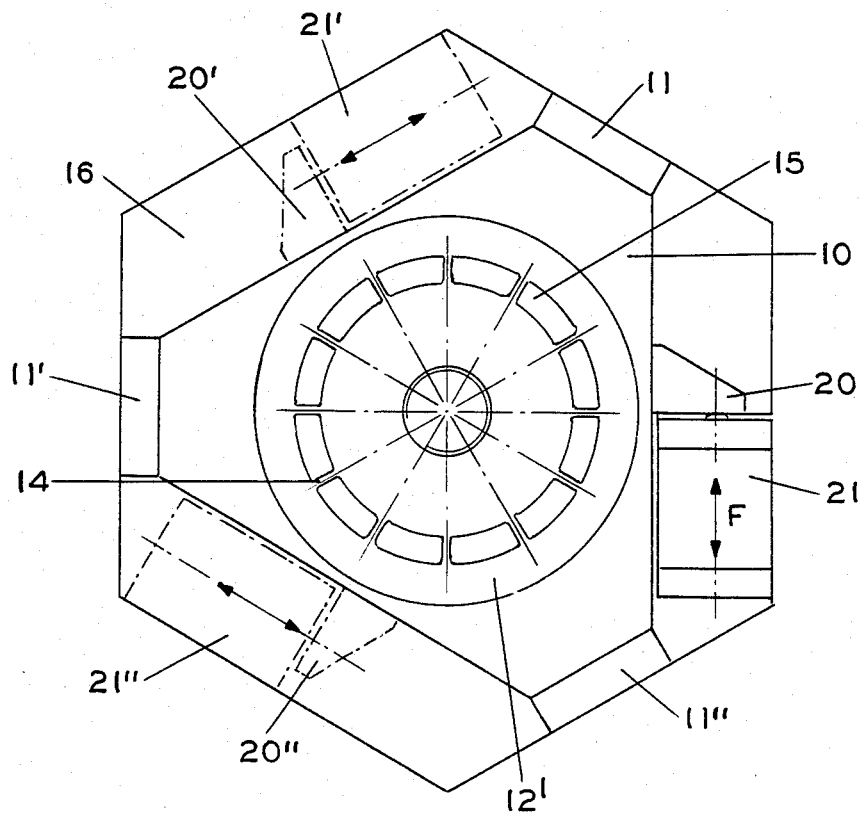
FIGS. 3a and 3b are a top view and a sectional view respectively of a ring laser gyroscope according to the invention.
Figure 3B:
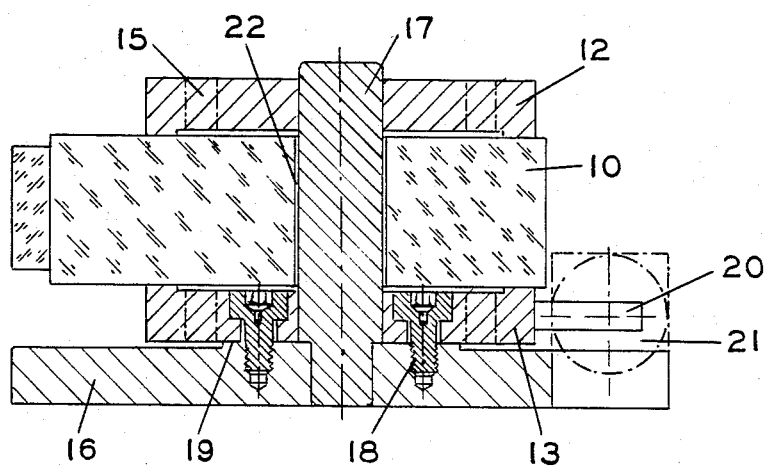

According to the FIGS. 3a and 3b, the real ring laser gyroscope consists of a triangular-shaped block 10 made of a mechanically and thermally stable material such as Zerodur, Cervit, quartz, and the like. A laser bulb is integrated respectively, modularly inserted in a known manner and which comprises a triangular-shaped path for the light waves which, however, is not shown. In the corner points of the Zerodur block 10, three mirrors with piezo driving means are arranged as reflectors for balancing the length of the resonator which is shown by blocks 11, 11' and 11". At one of those mirrors, in addition, decoupling of the trains of light waves is achieved.

The Zerodur block 10 is clamped between discs 12 and 13. Clamping is achieved herewith in the marginal area by those discs having an enlarged thickness in their marginal areas. To achieve the behavior of a torsion spring, both discs are provided with cutouts 15, spaced by ribs 14 with those cutouts being arranged on a circle. The discs, preferably, are made from metal.

A stationary mounting block 16 comprises an upwards extending central threaded pin 17. The lower disc 13 is slipped over the threaded pin by means of a central opening in it, and it is fixed to the mounting block 16 by means of screws 18. A step 19 at the mounting block 16 contact between the lower disc 13 and the mounting block 16 in an area which extends radially outward from the cutouts 15. The lower disc 13 comprises at least an arm 20, extending radially outward which arm is engaged by a motor 21 in tangential direction in a push or pull manner. The upper disc 12 comprises a centrally threaded bore with which it is screwed on the threaded pin 17 so that it is clamping the Zerodur block 10 between it and the lower disc 13 in the marginal area with the Zerodur block 10 being slipped over the threaded pin 17 by means of a central opening 22.

In principle, a plurality of synchronously driven motors 21, 21' and 21" could engage a plurality of radially extending arms 20, 20' and 20"; however, it has shown that a single piezoelectric linear motor 21 is sufficient to impart the dither motion. Herewith, the torsion spring 12, 13 is slightly biased so that motion results without backlash and with positive lock of the block.

As motors, longitudinal, respectively transversal piezoelectric pile drivers 21, are used which are shown in FIGS. 4a and 4b. Pile drives of the variety shown have very high displacement forces so that they can act against high loads without any remarkable reduction of the displacement. Therefore, under usage of such drives 21, the torsion spring 12, 13 may be dimensioned extremely tough so that due to the enlarged spring rate in comparison with known dither motors, a much higher resonant frequency of the system may be achieved and the system may be advantageously operated below the resonant frequency.

Intentionally renouncing a resonant rise due to the high displacement force of the motor, one can also achieve a sufficient amplitude below the resonant frequency whereat a driving motion different from the sine-shape has proven particularly advantageous.

According to the invention, a triangular-shaped dither motion below the resonant frequency of the rotary pendulum is proposed which may be attained by an appropriately shaped curvature of the voltage driving the piezomotor (pre-programmed or by means of a control circuit) as well as by an appropriately chosen attenuation of the rotary pendulum.

Figure 1:
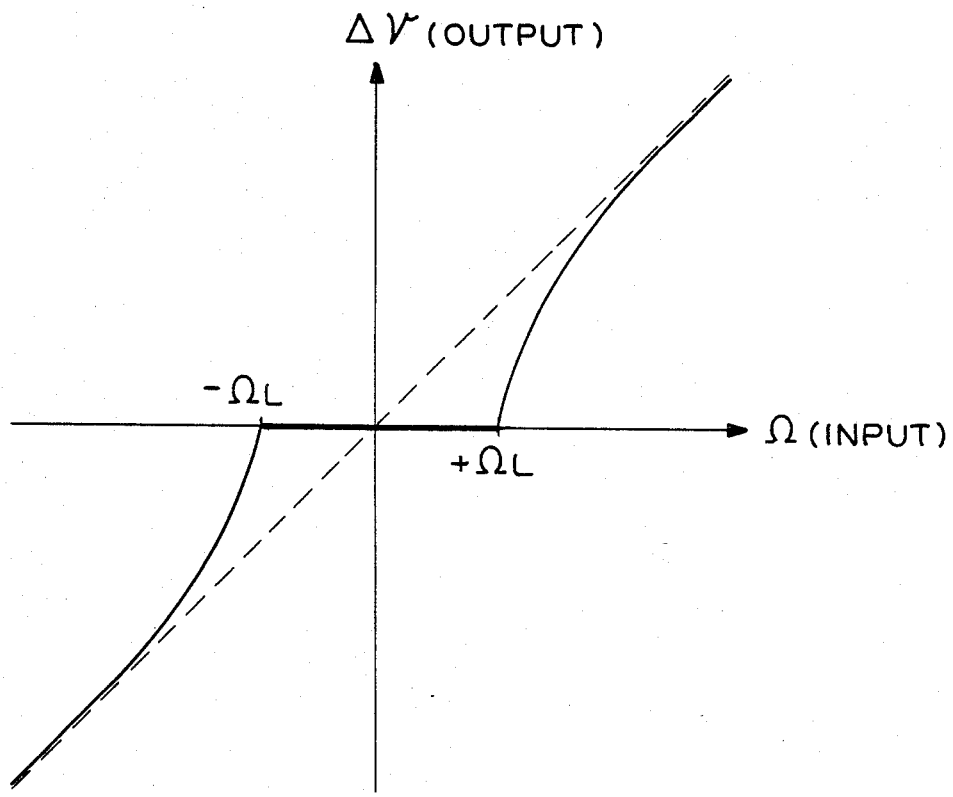
FIG. 1 is a graph to show the lock-in effect of a ring laser.
Figure 2A:
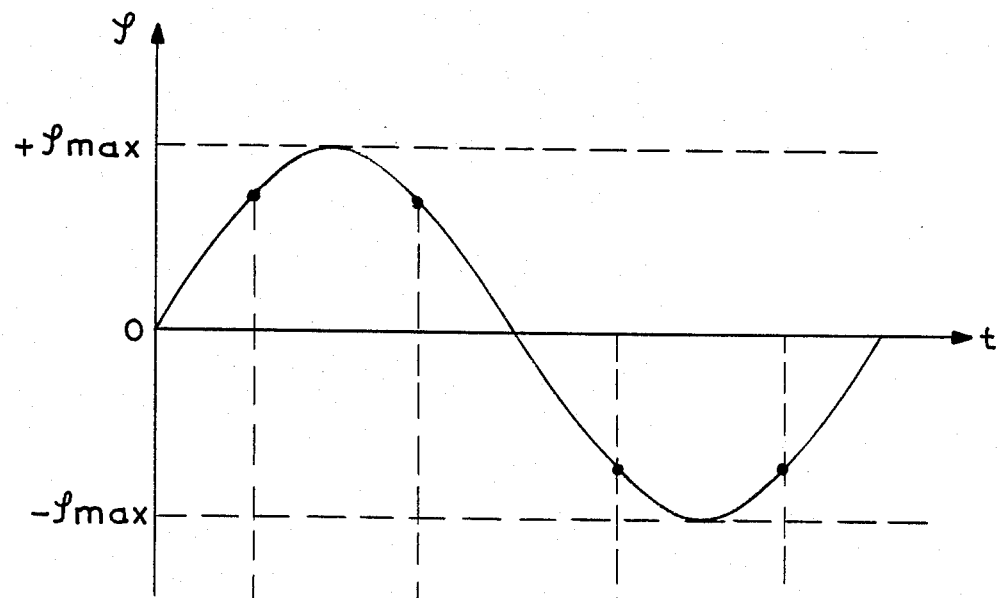
FIGS. 2a and 2b are graphs to show the dead time in relation to the measuring time for a ring laser having sinusoidal dither motion.
Figure 2B:
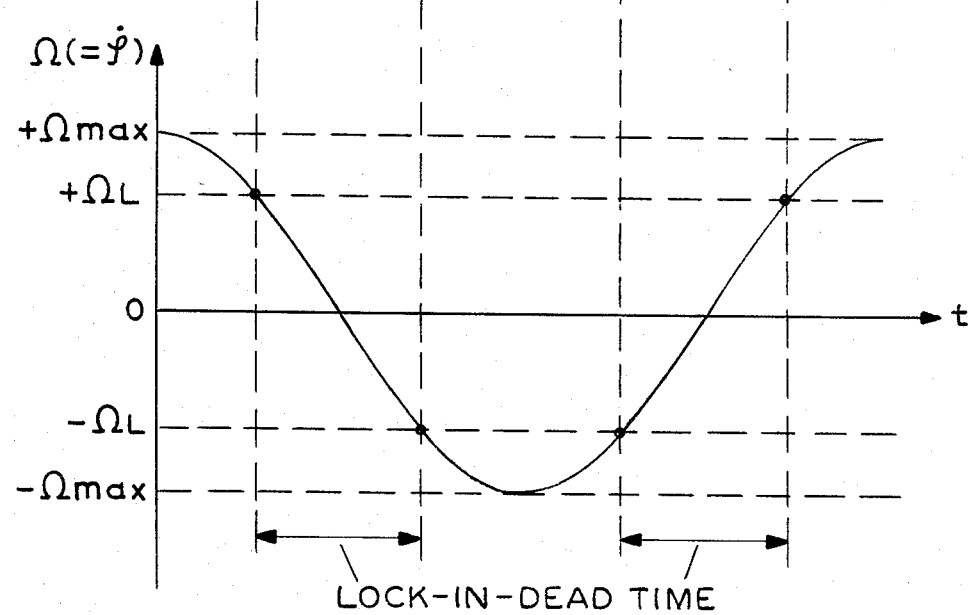
Figure 5A:
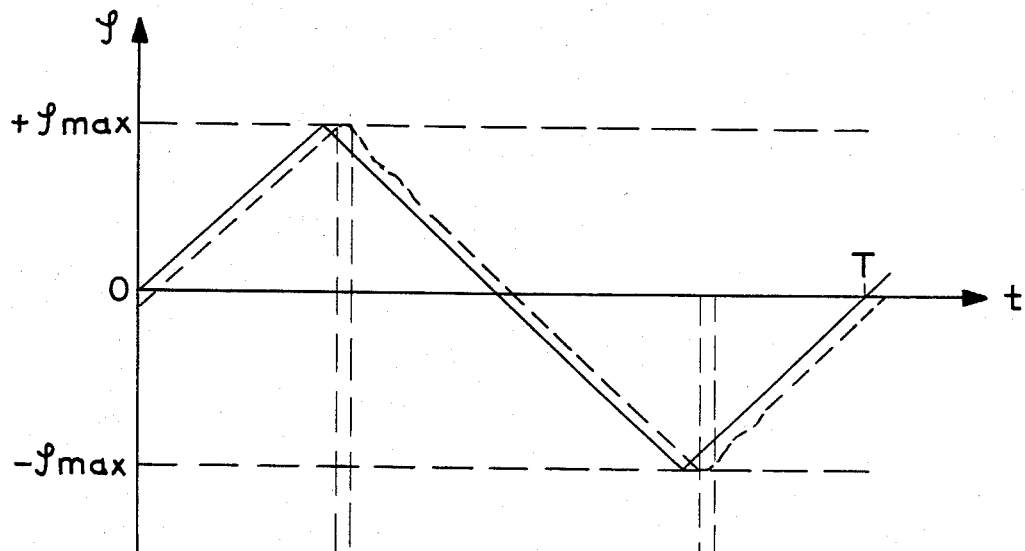
FIGS. 5a and 5b are graphs to show the relation between the dead time and measuring time of a ring laser gyroscope to which oscillation is induced according to the invention.
Figure 5B:
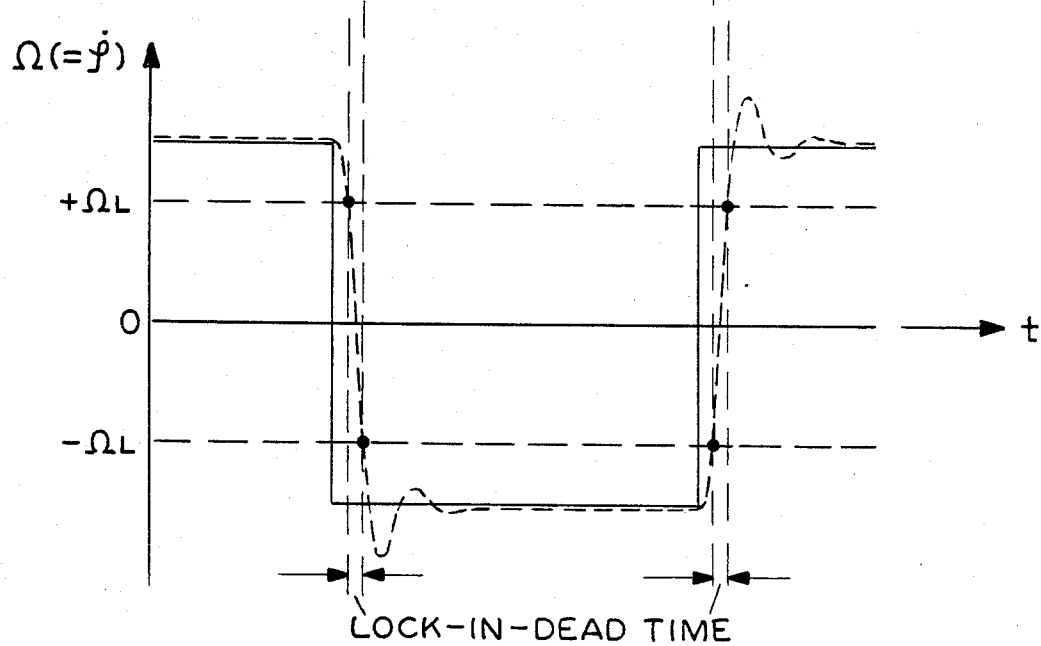

From FIGS. 5a and 5b it may be taken that with such control a remarkable reduction of the dead time of the gyroscope is attained with respect to the known behavior shown in the FIGS. 2a and 2b. In the FIGS. 5a and 5b, each solid line is showing the ideal response and the dotted line is showing the effective response of the rotational angle and the rotational rate as a function of the time.

In order to prevent accumulation of an error signal at a periodic sequence of the lock-in intervals and at certain input rotational rates, the triangular oscillation may be advantageously modulated. This may be done by a stochastically distributed symmetrical frequency modulation of the triangular oscillation ($\Delta\gamma \approx 0, 1, \gamma$) and/or by an amplitude modulation of the triangular oscillation by means of a randomly appearing small oscillating component.

It is noted that the dead time of the gyroscope attains a minimum if the gyroscope is oscillating at the lowest possible periodical frequency of the triangular oscillation and if, on the other hand, the mechanical rotary pendulum has an inherent frequency as high as possible. Then the dead time is determined by the real shape of the triangular tip with the radius of curvature of that tip being not larger than the sinusoidal tip in the event of resonance. Compared with laser gyroscopes known until now, the figure of merit mentioned at the beginning may be enlarged in the order of two powers of ten.

Although a triangular-shaped oscillation of the support of the gyroscope below the resonant frequency leads to especially good results, it is noted that the sine-shaped oscillation with the resonant frequency also achieves an important improvement with respect to known gyroscopes since the piezoelectric tangential driving means is able to act against high spring rates so that with a dither amplitude of approximately the same magnitude an essentially higher resonant frequency results.

The embodiments of the invention in which an exclusive property or right is claimed are defined as follows:

1. A ring laser gyroscope comprising:
    a first block for providing a path for light waves;
    a mounting block;
    torsion spring means for rotating said first block spring means having a first portion fixed to said first block and a second portion fixed to said mounting block; and
    linear motor means positively locked and tangentially coupled to said first block for oscillating said first block relative to said mounting block in response to a driving signal.

2. The apparatus of claim 1 wherein said linear motor is adapted to be controlled by a non-sinusoidal signal thereby providing said rotational oscillations differing substantially from sinusoidal shaped oscillations and having substantially shortened reversal intervals with respect to a sinusoidal shaped oscillation such that sensor lock-in dead time is minimized.

3. The apparatus of claim 1 wherein said linear motor is positioned in such a manner so as to preload said torsion spring means in an unoperated condition of said linear motor.

4. The apparatus of claim 1 wherein said linear motor is a piezoelectric motor.

5. The apparatus of claim 4 wherein said piezoelectric motor comprises stacked piezoelectric devices operative in unison so as to provide longitudinal displacement along said stack.

6. The apparatus of claim 2 wherein the rate of rotation of said support structure produced by said rotational oscillations is characterized by substantially a triangular shape.

7. The apparatus of claim 2 wherein said linear motor is controlled by a triangular shaped control signal of a first frequency for providing a varying rate of rotation of said support structure, resulting from said rotational oscillations which is characterized by substantially a triangular shape.

8. The apparatus of claim 6 wherein said rotational oscillations are below the resonant frequency of said spring-mass system comprising said first block, said torsion spring means, and said mounting block.

9. The apparatus of claim 7 further comprising means for altering said control signal for providing a stochastically distributed symmetrical frequency modulation of said triangular shaped oscillations.

10. The apparatus of claim 7 further comprising means for altering said control signal for providing amplitude modulation of said triangular shaped oscillations.

11. The apparatus of claim 7 further comprising means for providing a random small oscillation component of said control signal so as to provide random amplitude modulation of said triangular shaped oscillations.

* * * * *

UNITED STATES PATENT AND TRADEMARK OFFICE
CERTIFICATE OF CORRECTION

PATENT NO. : 4,533,248

DATED : August 6, 1985

INVENTOR(S) : Rainer Baumann

It is certified that error appears in the above-identified patent and that said Letters Patent is hereby corrected as shown below:

```
Column 5, line 20, before "spring" insert --relative
     to said mounting block, said torsion--.
```

Signed and Sealed this

Sixth Day of May 1986

[SEAL]

Attest:

DONALD J. QUIGG

Attesting Officer

Commissioner of Patents and Trademarks